United States Patent
Lee et al.

(10) Patent No.: US 8,121,085 B1
(45) Date of Patent: Feb. 21, 2012

(54) SLOT ALLOCATION METHOD AND APPARATUS FOR SLOT-BASED COMMUNICATION

(75) Inventors: Jungwon Lee, Cupertino, CA (US); Jihwan P. Choi, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 723 days.

(21) Appl. No.: 12/118,525

(22) Filed: May 9, 2008

Related U.S. Application Data

(60) Provisional application No. 60/917,174, filed on May 10, 2007.

(51) Int. Cl.
*H04W 16/10* (2009.01)
*H04W 16/22* (2009.01)
*H04W 24/02* (2009.01)
*H04W 72/04* (2009.01)

(52) U.S. Cl. .......................... 370/330; 370/208; 375/260

(58) Field of Classification Search .................. 370/208, 370/330, 328, 341, 436; 375/260, 364
See application file for complete search history.

(56) References Cited

U.S. PATENT DOCUMENTS

| | | | |
|---|---|---|---|
| 5,822,318 A | | 10/1998 | Tiedemann, Jr. et al. |
| 7,215,653 B2 | | 5/2007 | Kim et al. |
| 7,218,644 B1 | | 5/2007 | Heinonen et al. |
| 7,392,054 B2 * | | 6/2008 | Cho et al. ...................... 455/447 |
| 7,423,997 B2 | | 9/2008 | Kuchibhotla et al. |
| 7,801,490 B1 | | 9/2010 | Scherzer |
| 2004/0097238 A1 * | | 5/2004 | Hwang et al. ................. 455/447 |
| 2005/0053123 A1 | | 3/2005 | Higuchi et al. |
| 2005/0053164 A1 * | | 3/2005 | Catreux et al. ................ 375/260 |
| 2005/0111488 A1 | | 5/2005 | Subramanian et al. |
| 2006/0203765 A1 | | 9/2006 | Laroia et al. |
| 2007/0248048 A1 * | | 10/2007 | Zhu et al. ...................... 370/329 |
| 2008/0075032 A1 * | | 3/2008 | Balachandran et al. ....... 370/317 |
| 2008/0123569 A1 | | 5/2008 | Doss et al. |
| 2008/0159417 A1 * | | 7/2008 | Yin et al. ...................... 375/260 |
| 2008/0232341 A1 * | | 9/2008 | Andrews et al. .............. 370/345 |

(Continued)

FOREIGN PATENT DOCUMENTS

EP  1 718 002 A1  11/2006

OTHER PUBLICATIONS

Wong, C.Y. "Multiuser OFMD with Adaptive Subcarrier, Bit, and Power Allocation," IEEE Journal on Selected Areas in Communications, vol. 17, No. 10 pp. 1747-1758 (Oct. 1999).

(Continued)

*Primary Examiner* — Chi Pham
*Assistant Examiner* — Ahmed Elallam

(57) ABSTRACT

Communication between a base station and remote stations is partitioned into frames, each including a first frequency reuse zone having a number of slots. Slots are allocated by assigning a first data rate to each remote station for communication using the first frequency reuse zone. Each remote station is assigned a respective slot allocation comprising a first number of slots of the first frequency reuse zone and has a weighted data rate dependent on the first data rate and the respective slot allocation. The slot allocations are determined so as to maximize the minimum of the weighted data rates of the remote stations. Slots may be allocated using a data rate assigner to assign a first data rate to each remote station for communication using slots of the first frequency reuse zone, and using a slot allocation provider to provide a respective slot allocation for each remote station.

24 Claims, 8 Drawing Sheets

U.S. PATENT DOCUMENTS

| | | | |
|---|---|---|---|
| 2008/0299981 | A1 | 12/2008 | Foschini |
| 2009/0046606 | A1 | 2/2009 | Wan et al. |
| 2009/0092067 | A1 | 4/2009 | Sudarshan et al. |

OTHER PUBLICATIONS

"Mobile WiMAX-Part 1: A Technical Overview and Performance Evaluation," WiMax Form, Aug. 2006.

IEEE Standard for Local and metropolitan area networks: Part 16: Air Interface for Fixed Broadband Wireless Access Systems, IEEE Std. 802.16 2004, Oct. 1, 2004.

IEEE P802.16Rev2/D5 (Jun. 2008) (Revision of IEEE Std 802.16-2004 and consolidates material from IEEE Std 802.16e-2005, IEEE Std 802.16-2004/Cor1-2005, IEEE Std 802.16f-2005 and IEEE Std 802.16g-2007) "Draft Standard for Local and metropolitan area networks: Part 16: Air Interface for Broadband Wireless Access Systems," *The Institute of Electrical and Electronics Engineers, Inc.*, Jun. 2008.

IEEE Std 802.16-2004 (Revision of IEEE Std 802.16-2001), "IEEE Standard for Local and metropolitan area networks; Part 16: Air Interface for Fixed Broadband Wireless Access Systems," *The Institute of Electrical and Electronics Engineers, Inc.*, Oct. 1, 2004.

IEEE Std 802.16a-2003 (Amendment to IEEE Std 802.16-2001) "IEEE Standard for Local and metropolitan area networks: Part 16: Air Interface for Fixed Broadband Wireless Access Systems-Amendment 2: Medium Access Control Modifications and Additional Physical Layer Specifications for 2-11 GHZ," *The Institute of Electrical and Electronics Engineers, Inc.*, Apr. 1, 2003.

IEEE Std 802.16e-2005 and IEEE Std 802.16-2004/Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, *The Institute of Electrical and Electronics Engineers, Inc.*, Feb. 28, 2006.

U.S. Appl. No. 12/388,302, filed Feb. 18, 2009, entitled "Slot Allocation, User Grouping, and Frame Partition Method for H-FDD Systems" (unpublished).

Non-Final Office Action for U.S. Appl. No. 12/388,302, dated Nov. 1, 2010.

Final Office Action for U.S. Appl. No. 12/388,302, dated Apr. 19, 2011.

\* cited by examiner

SLOT ALLOCATION METHOD AND APPARATUS FOR SLOT-BASED COMMUNICATION

CROSS-REFERENCE TO RELATED APPLICATION

The present application claims the benefit of U.S. Provisional Application No. 60/917,174, entitled "SUBCARRIER ALLOCATION FOR WIMAX," filed on May 10, 2007, which is hereby incorporated by reference herein in its entirety.

FIELD OF TECHNOLOGY

The present disclosure relates generally to slot-based communication schemes and devices that use them, and more particularly, to techniques for allocating slots in one or more frequency reuse zones among a plurality of slot-based communication devices.

DESCRIPTION OF THE RELATED ART

Slot-based communication systems, such as WiMAX systems and other systems employing the IEEE 802.16 family of communication standards, typically include one or more base stations and two or more remote stations that communicate with the one or more base stations by transmitting data in a plurality of time and frequency slots within a predetermined communication spectrum available for the slot-based communication system. The time and frequency resources used in such communication systems is often divided into a series of frames, each comprising one or more frequency reuse spectra or frequency reuse zones, which are further refined or divided into slots, with each slot comprising one or more subcarriers and one or more symbols per subcarrier. Symbols may be modulated on subcarriers using orthogonal frequency-division multiplexing (OFDM), as in WiMAX systems, or using any other desired modulation scheme consistent with slot-based communication. A base station allocates the slots available in each frequency reuse zone at any given time among the remote stations communicating with that base station at that time. In carrying out this allocation of available slots, the base station seeks to attain performance goals such as maximizing system capacity or minimizing power consumption.

Prior approaches to allocating slots among system users or remote stations have involved complex calculations and may have provided high system capacity and/or low power consumption but often have achieved unsatisfactory results in terms of maximizing system capacity, attaining acceptable quality of service (QoS) for each user of the system (i.e., each remote station), and providing fairness to system users with respect to time and frequency resource allocation, delay times, and other operational metrics.

SUMMARY OF THE DISCLOSURE

Embodiments described herein are adapted for use in WiMAX systems and other slot-based communication system having at least one base station and a plurality of remote stations, wherein time and frequency resource available for communication among the at least one base station and the plurality of remote stations is partitioned into a series of frames, each frame including at least a first frequency reuse zone having a first total number of slots. Slots may be allocated in a way that seeks to maximize system capacity, attain acceptable QoS for system users, provide fairness to users, etc.

In one embodiment, slots in such a communication system are allocated by assigning a first frequency reuse zone data rate to each remote station for communication of that remote station using slots of the first frequency reuse zone and providing, for each remote station, a respective slot allocation for communication between that remote station and the base station. Each respective slot allocation comprises a first number of slots of the first frequency reuse zone, and each remote station has a weighted data rate dependent on the first frequency reuse zone data rate assigned to that remote station and the respective slot allocation of that remote station whereby a minimum of the weighted data rates of the plurality of remote stations varies with the respective slot allocations provided for the plurality of remote stations. Further, the respective slot allocations of the plurality of remote stations are determined so as to maximize, using linear programming or other techniques, the minimum of the weighted data rates of the plurality of remote stations.

A weight may be assigned to each remote station, wherein the weighted data rate of each remote station is further based on the weight assigned to that remote station.

The weighted data rate of each remote station i may be given by $$\frac{n_{1,i} R_{1,i}}{w_i},$$

where $n_{1,i}$ is the first number of slots of the first frequency reuse zone allocated to remote station i, $R_{1,i}$ is the first frequency reuse zone data rate assigned to the remote station i for communication using slots of the first frequency reuse zone, and $w_i$ is the weight assigned to the remote station i.

Each frame may include a plurality of frequency reuse zones, instead of just one, each having a corresponding total number of slots in accordance with the principles of the present invention. For each of the frequency reuse zones, a frequency reuse zone data rate may be assigned to each remote station of the plurality of remote stations for communication of that remote station using slots of that frequency reuse zone. At least one of the respective slot allocations further comprises at least a portion of the total number of slots of each frequency reuse zone, wherein the weighted data rate of each remote station i may be given by $$\frac{\sum_{z=1}^{Z} n_{z,i} R_{z,i}}{w_i},$$

where $n_{z,i}$ is the number of slots of the $z^{th}$ frequency reuse zone allocated to remote station i, $R_{z,i}$ is the frequency reuse zone data rate assigned to the remote station i for communication using slots of the $z^{th}$ frequency reuse zone, and $w_i$ is the weight assigned to the remote station i. Every slot in at least one of the frequency reuse zones may be allocated to a remote station. Where a remote station has a corresponding minimum required data rate, the slot allocation for that remote station may seek to achieve a data rate for that remote station that is at least as great as the corresponding minimum required data rate for that remote station.

Using orthogonal frequency division multiplexing or any other desired modulation technique, data may be communicated between the at least one base station and at least one of the plurality of remote stations, in accordance with the respective slot allocation of that remote station.

In another embodiment, slots in a slot-based communication system may be allocated by an apparatus comprising a data rate assigner configured to assign a first frequency reuse zone data rate to each remote station of the plurality of remote stations for communication of that remote station using slots of the first frequency reuse zone and a slot allocation provider configured to provide a respective slot allocation for each remote station for communication between that remote station and the base station. Each respective slot allocation comprises a first number of slots of the first frequency reuse zone, wherein each remote station has a weighted data rate dependent on the first frequency reuse zone data rate assigned to that remote station and the respective slot allocation of that remote station whereby a minimum of the weighted data rates of the plurality of remote stations varies with the respective slot allocations provided for the plurality of remote stations; and the respective slot allocations of the plurality of remote stations are determined so as to maximize the minimum of the weighted data rates of the plurality of remote stations.

DETAILED DESCRIPTION

Figure 1:
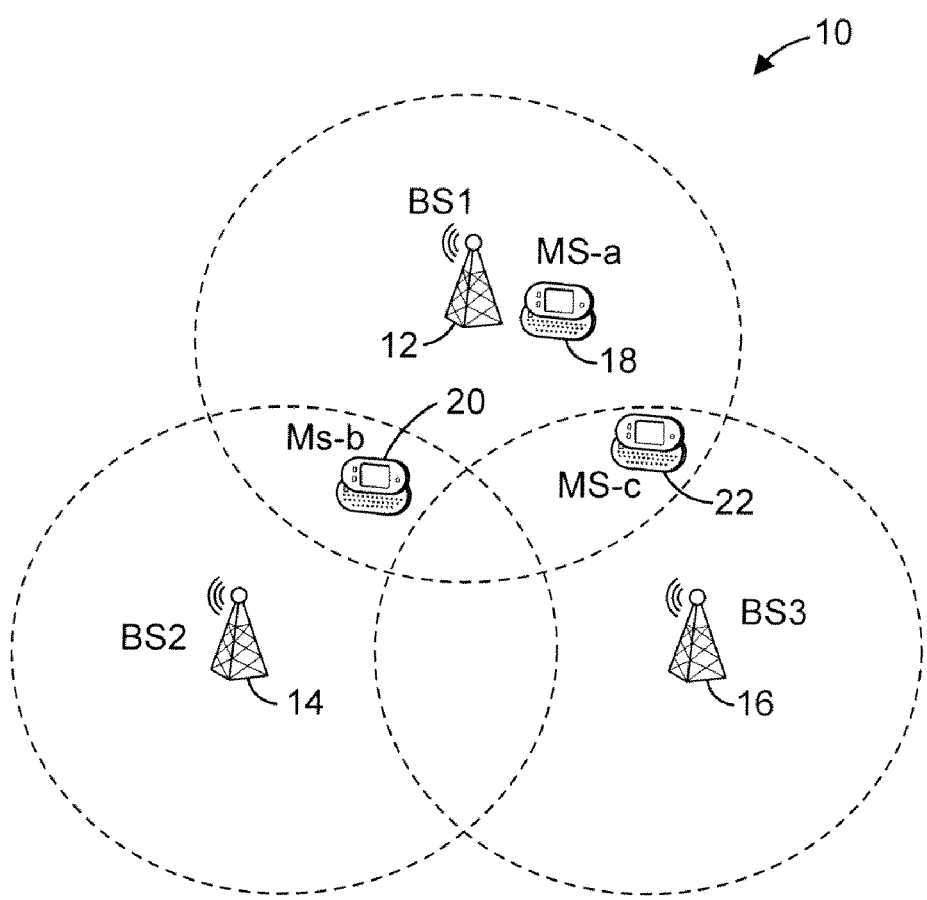
FIG. 1 depicts a cellular communication system exemplary of the type of slot-based communication system in which slot-allocation techniques may be used.

FIG. 1 depicts an exemplary communication system 10 in connection with which slot-allocation methods and apparatus described herein may be used. More particularly, the slot-allocation techniques may be used in cellular and other communication systems and may employ the IEEE 802.16 family of communication standards or any other slot-based communication techniques to provide for communication among one or more base stations and a plurality of remote stations, which may be either fixed (i.e., stationary) or mobile stations. The exemplary communication system 10 illustrated in FIG. 1 includes three base stations 12, 14, 16 and three remote stations 18, 20, 22.

In slot-based communication systems, such as systems employing WiMAX (WiMAX systems) as well as, more generally, cellular and other communication systems for providing voice, data, audio, and video communication, efficient operation requires careful allocation of available time and frequency resources among all remote stations using the system to achieve performance objectives such as maximum usage, quality of service requirements, and fairness to users, for example. For explanatory purposes, an exemplary WiMAX system as shown in FIG. 1 is described herein, but those of ordinary skill in the art will appreciate that slot-allocation techniques described herein also may be used in any other slot-based communication system. Further, the slot-allocation techniques may be practiced in connection with communication systems employing modulation schemes other than the orthogonal frequency-division multiplexing (OFDM) typically employed by WiMAX systems.

The illustrated WiMAX system 10 has a predetermined amount of available time and frequency resource which is divided into frames. Each frame preferably has at least a first frequency reuse zone (e.g., a "frequency reuse 1 zone") and a second frequency reuse zone (e.g., a "frequency reuse 3 zone"), each of which is divided into minimum data allocation units called slots. A slot corresponds to a predetermined range of subcarriers (e.g., 14, 24, or 48 subcarriers, etc.) at a given time and for a predetermined duration (e.g., 0.3 ms). In a WiMAX system, the frequency reuse 1 zone and the frequency reuse 3 zone have an important functional difference. Each remote station using the frequency reuse 1 zone can communicate at an assigned time using all subcarriers assigned to that remote station. In contrast, the subcarriers in the frequency reuse 3 zone are split into three segments in the frequency domain, permitting remote stations to communicate on a given segment at a given time. The base stations 12, 14, 16 preferably allocate available slots to remote stations judiciously, as described herein in detail.

Efficient operation of the communication system requires that the slots of the frequency reuse 1 zone and the frequency reuse 3 zone be efficiently allocated to the remote stations 18, 20, 22. One aspect of efficiently allocating slots to remote stations involves taking advantage of the above-described functional difference between the frequency reuse 1 zone and the frequency reuse 3 zone. Specifically, a remote station that is located near a cell edge, where it may encounter interference from adjacent cells, is allocated slots in the frequency reuse 3 zone in order to mitigate the interference that that remote station encounters from the adjacent base stations. For example, the remote station 20 shown in FIG. 1 is near the cell edge of base station 12 and may encounter interference from the adjacent base stations 14 and 16. On the other hand, a remote station having little inter-cell interference (e.g., remote station 18) is allocated slots in the frequency reuse 1 zone so that the remote station 18 can advantageously use the entire communication spectrum allotted to it by the base station 12.

In WiMAX and other cellular systems, each remote station periodically provides to the base station with which it is communicating at any given time information regarding the carrier-to-interference-plus-noise ratio (CINR) for the remote station within each frequency reuse zone. This enables the base station to calculate the data rate per slot for each remote station and each frequency reuse zone. Each such data rate is given as a deterministic function of the CINR encountered by the remote station in the frequency reuse zone, as is well-known. Thus, in the frequency reuse 1 zone, each remote station i has a CINR of $S_{1,i}$ and a data rate given by $R_{1,i}=f(S_{1,i})$. Similarly, in the frequency reuse 3 zone, each remote station i has a CINR of $S_{3,i}$ and a data rate given by $R_{3,i}=f(S_{3,i})$.

In the illustrated example, the base station 12 assigns slots in the frequency reuse 1 zone and the frequency reuse 3 zone to remote stations or users communicating with the base station 12 and attempts, in doing so, to maximize system capacity, provide fairness to users, meet users' individual requirements for quality of service, etc. Of course, these performance goals may conflict at times and require tradeoffs in allocating slots among remote stations. However, the slot-allocation techniques described below provide a way for base stations of a slot-based communication system to efficiently allocate slots among remote stations.

Figure 2:
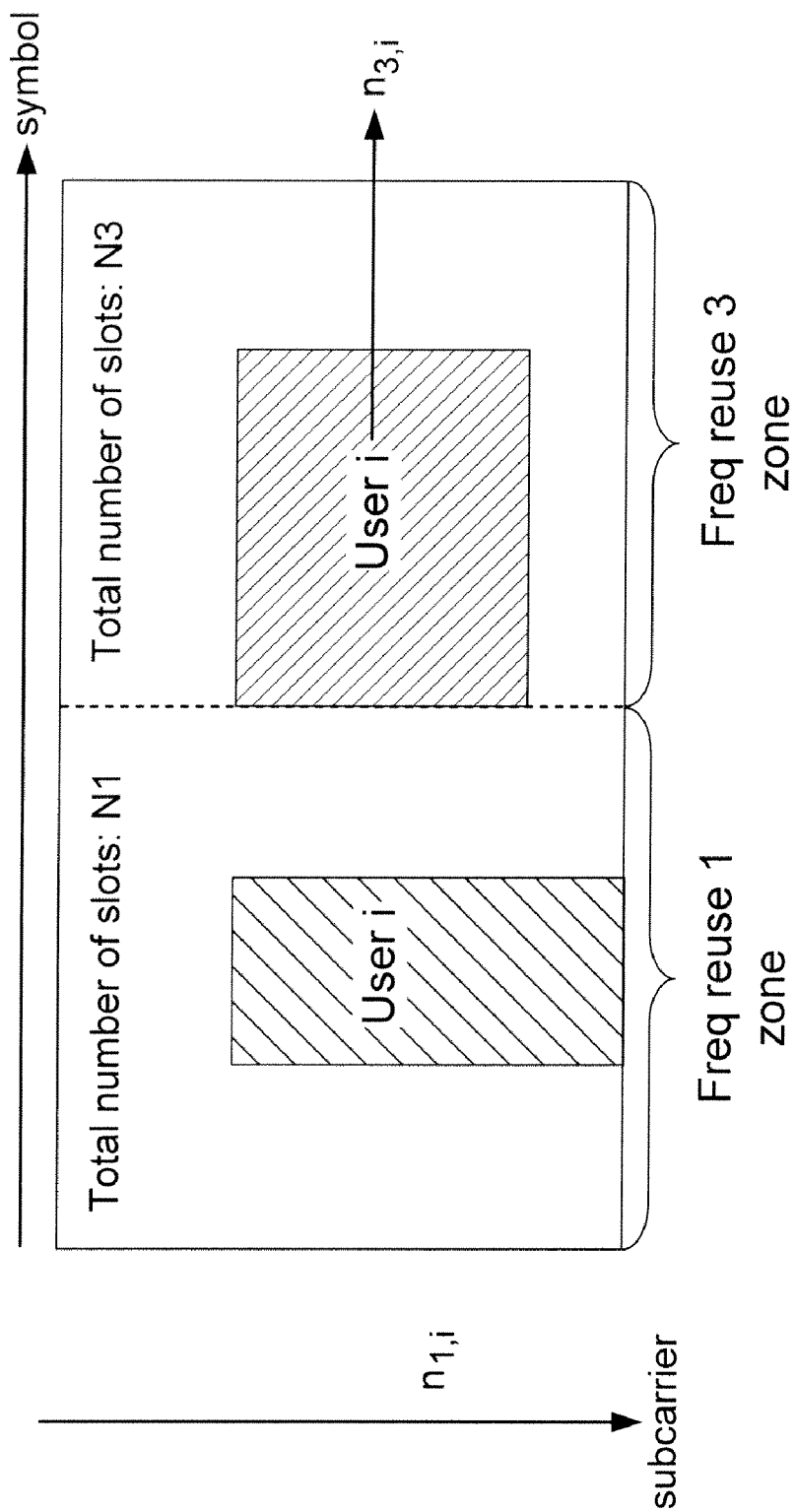
FIG. 2 depicts an exemplary downlink frame for a slot-based communication system having a frequency reuse 1 zone and a frequency reuse 3 zone with slots of each zone allocated to a user i.

FIG. 2 graphically depicts a downlink frame for communication in an exemplary WiMAX system, including frequency reuse 1 and 3 zones. As shown, the horizontal axis represents time (or symbols), and the vertical axis represents frequency (or subcarrier). The frequency reuse 1 zone, then, comprises a portion of the downlink frame available in the communication system and, in the embodiment illustrated in FIG. 1, corresponds to the downlink range of subcarriers used by one of the base stations 12, 14, or 16 for a predetermined time period. Similarly, the frequency reuse 3 zone corresponds to the downlink range of subcarriers used by the base station 12, 14, or 16 for another time period, which could be the same duration as, or a different duration than, the duration of the frequency reuse 1 zone. Each frequency reuse zone is further divided into slots of a predetermined size. For example, a slot can be as small as one symbol by one subcarrier, or can be any desired larger size. In the example downlink frame illustrated in FIG. 2, the frequency reuse 1 zone includes a total number N1 of slots, and the frequency reuse 3 zone includes a total number N3 of slots.

The hatched areas shown within the frequency reuse 1 zone and the frequency reuse 3 zone in FIG. 2 represent time and frequency resources allocated to a user i (i.e., the remote station belonging to user i). For convenience, the numbers of slots allocated to user i in the frequency reuse zone 1 and the frequency reuse 3 zone of the downlink frame, respectively, are expressed herein as $n_{1,i}$ and $n_{3,i}$.

Figure 3:
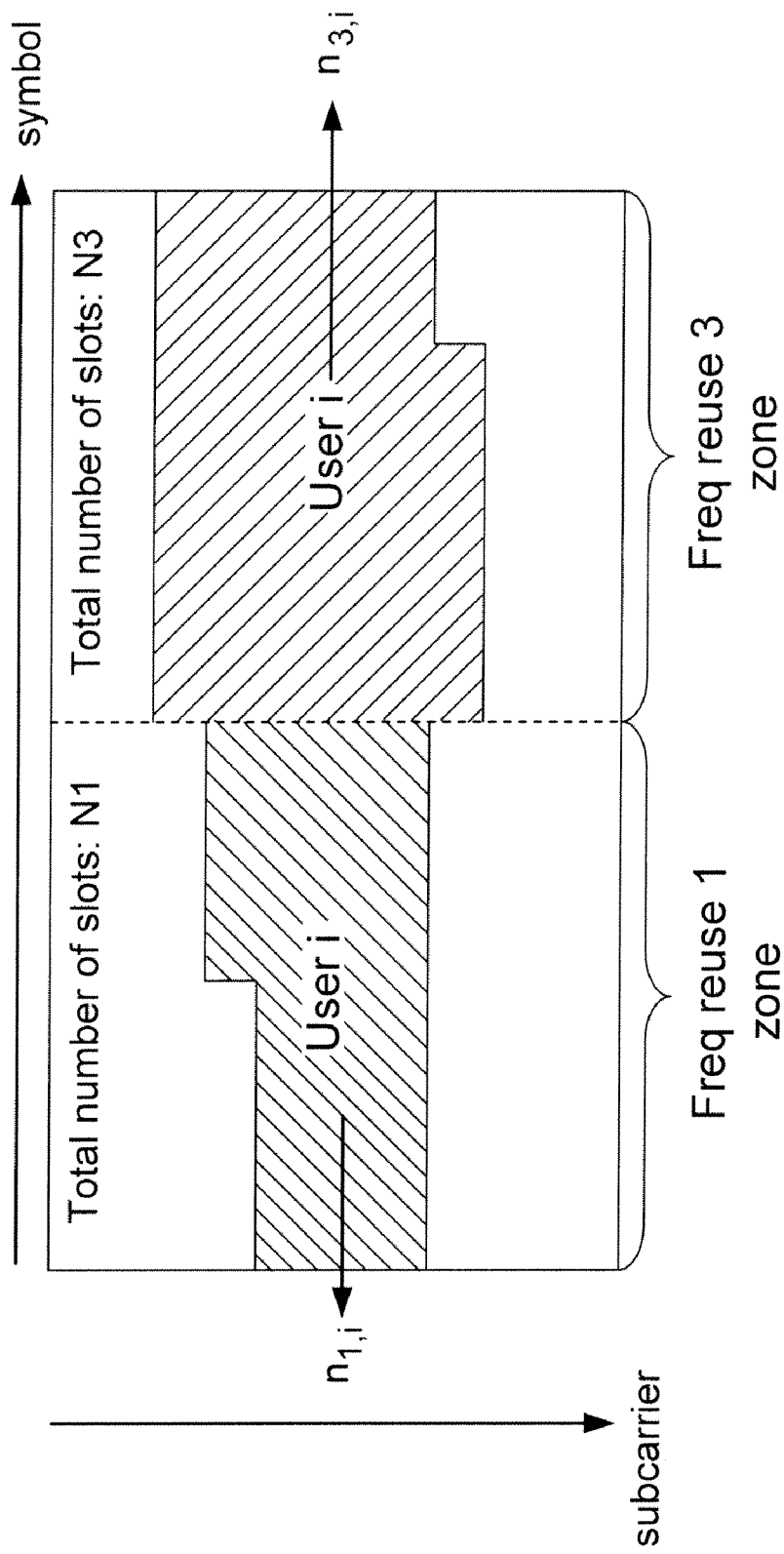
FIG. 3 depicts an exemplary uplink frame for a slot-based communication system having a frequency reuse 1 zone and a frequency reuse 3 zone with slots of each zone allocated to a user i.

FIG. 3 graphically depicts an uplink frame for communication in the same exemplary WiMAX system. As shown, the uplink frame is similar to the downlink frame described above, except that the hatched areas indicating the time and frequency resources allocated to user i in each of the frequency reuse 1 and 3 zones have different shapes, consistent with the WiMAX specification (i.e., they are not rectangular). However, the same nomenclature may be used to express the numbers of slots allocated to the user i in each of the frequency reuse 1 and 3 zones, that is, the numbers of slots allocated to user i in the frequency reuse zone 1 and the frequency reuse 3 zone of the uplink frame, respectively, are expressed herein as $n_{1,i}$ and $n_{3,i}$. Thus, the slot allocation techniques described herein can be used for uplink as well as downlink communication scheduling.

In order to take account of differing levels of quality of service (QoS) required by and/or provided to different remote stations (i.e., different users), the allocation of slots for a base station to the remote stations communicating with that base station may include determining a weighted per-remote-station data rate for each remote station. This data rate may be obtained by summing the data rates for the remote station in each of the frequency reuse zones to develop a composite data rate for each remote station and then applying a weighting to the composite data rate of each remote station reflective of the desired QoS for that remote station. Those skilled in the art will appreciate that a minimum of the weighted data rates of the plurality of remote stations will vary with the respective slot allocations provided for the plurality of remote stations. Then, the overall slot allocation may be determined by maximizing the minimum of the weighted per-user data rates across all users and frequency reuse zones.

In symbolic terms, the slot-allocation approach seeks to maximize the quantity:

$$\min_{i=1,\ldots I} \frac{n_{1,i} R_{1,i} + n_{3,i} R_{3,i}}{w_i},$$

where a cell has I users (Expression 1) subject to the following constraints:

$$\sum_{i=1}^{I} n_{1,i} = N_1, \qquad \text{(Constraint 1)}$$

$$\sum_{i=1}^{I} n_{3,i} = N_3, \qquad \text{(Constraint 2)}$$

$$n_{1,i} \geq 0, \text{ for all } i = 1, \ldots I \qquad \text{(Constraint 3)}$$

$$n_{3,i} \geq 0, \text{ for all } i = 1, \ldots I \qquad \text{(Constraint 4)}$$

Constraints 1 and 2 require that the total of the numbers of slots allocated to all I users or remote stations in each frequency reuse zone is equal to the total number of slots present in that frequency reuse zone. In other words, these constraints mean that all slots in each frequency reuse zone are allocated to one of the I users I and thus that all slots are used.

Constraints 3 and 4 require the numbers of slots allocated to each user in the frequency reuse 1 zone (Constraint 3) and the frequency reuse 3 zone (Constraint 4) to be non-negative numbers.

The denominator of the quantity defined by Expression 1, $w_i$, is a numerical weight assigned to each user or remote station i, which may correlate with, for example, the priority or price of communications of user i. It will be apparent to those of ordinary skill in the art that a given user i for whom $w_i=0$ will have a weighted data rate of $$\frac{n_{1,i} R_{1,i} + n_{3,i} R_{3,i}}{w_i} = \infty.$$

Consequently, the weighted data rate of that user cannot be a minimum of the weighted data rates among all users and thus will not bear on the maximization of that minimum. It should be noted that inasmuch as each remote station has a weighted data rate as described above, necessarily and inherently there will be a "minimum" weighted data rate associated with a group of remote stations (e.g., the group communicating with a base station), and this minimum is what is maximized. One or more remote stations in the group may have the minimum weighted data rate.

In Expression 1, $n_{1,i}$ and $n_{3,i}$ (the numbers of slots allocated to each user i in frequency reuse 1 and 3 zones, respectively), are control variables. Values for $n_{1,i}$ and $n_{3,i}$ may be determined in order to maximize the minimum of the per-user weighted data rate. In other words, the slots of each frequency reuse zone are allocated among the plurality of remote stations communicating with a base station at a given time in such a way that the weighted data rate of whichever remote station has the lowest weighted data rate among all of the remote stations (i.e., the "minimum weighted data rate") is maximized. Thus, this solution advantageously takes account of the differing quality-of-service (QoS) requirements of all I users, each of which may either be satisfied by "best-efforts" service, in which the base station provides communication to the user or remote station when it is possible to do so in light of other higher-priority communication traffic, or may have a minimum data rate requirement based on the particular type of communication being handled for that remote station. For example, video data may require a relatively high minimum data rate for acceptable quality, whereas acceptable interne browsing and other less data-intensive communication may be provided with a "best efforts" data rate.

Appropriate values for the control variables $n_{1,i}$ and $n_{3,i}$ may be determined using linear programming, for example, to maximize the value of an auxiliary variable R, where R has the value of Expression 1 above.

In other words, the linear programming problem is to maximize:

$$R = \min_{i=1,\ldots I} \frac{n_{1,i}R_{1,i} + n_{3,i}R_{3,i}}{w_i} \quad \text{(Equation 1)}$$

subject to:

$$n_{1,i}R_{1,i} + n_{3,i}R_{3,i} \geq w_i R, \text{ for all } i \quad \text{(Constraint 5)}$$

$$\sum_{i=1}^{I} n_{1,i} = N_1, \quad \text{(Constraint 6)}$$

$$\sum_{i=1}^{I} n_{3,i} = N_3, \quad \text{(Constraint 7)}$$

$$n_{1,i} \geq 0, \text{ for all } i \quad \text{(Constraint 8)}$$

$$n_{3,i} \geq 0, \text{ for all } i \quad \text{(Constraint 9)}$$

Constraint 5 requires the composite weighted data rate of each user or remote station I to be greater than or equal to the maximized minimum per-user data rate R multiplied by the weight $w_i$ user i.

Constraints 6 and 7 require all slots in each of frequency reuse 1 and 3 zones to be allocated to one of the I users.

Constraints 8 and 9 require the numbers of slots allocated to each user i in the frequency reuse 1 zone (Constraint 8) and the frequency reuse 3 zone (Constraint 9) to be non-negative numbers.

To account for the minimum data rate that some users or remote stations require due to QoS requirements such as delay constraints, for example, the foregoing optimization problem may be modified by replacing Constraint 5 with:

$$n_{1,i}R_{1,i} + n_{3,i}R_{3,i} \geq \max(w_i R, R_{min,i}) \quad \text{(Constraint 10)}$$

where $R_{min,i}$ is the minimum data rate that user i requires because of any quality-of-service requirements of user i.

Three types of users may be considered.

Some users may be satisfied if all of their data is communicated at whatever minimum data rate is determined for the overall communication system 10. For these users, their corresponding weight may be set to zero ($w_i=0$). As explained above, the weighted data rate of these users will have no bearing on the maximization of the minimum weighted per-user data rate.

Other users may require a particular minimum data rate because of QoS or other requirements. These users will have a non-zero $w_i$ and a non-zero $R_{min,i}$.

Still other users may be satisfied if all of their data is communicated on a when-possible or "best efforts" basis. For these users $R_{min,i}$ 0.

Constraint 10 is equivalent to the following two constraints:

$$n_{1,i}R_{1,i} + n_{3,i}R_{3,i} \geq w_i R \quad \text{(Constraint 11)}$$

$$n_{1,i}R_{1,i} + n_{3,i}R_{3,i} \geq R_{min,i} \quad \text{(Constraint 12)}$$

Thus, the linear programming problem becomes to maximize:

$$R = \min_{i=1,\ldots I} \frac{n_{1,i}R_{1,i} + n_{3,i}R_{3,i}}{w_i} \quad \text{(Equation 1)}$$

subject to:

$$\sum_{i=1}^{I} n_{1,i} = N_1, \quad \text{(Constraint 6)}$$

$$\sum_{i=1}^{I} n_{3,i} = N_3, \quad \text{(Constraint 7)}$$

$$n_{1,i} \geq 0, \text{ for all } i \quad \text{(Constraint 8)}$$

$$n_{3,i} \geq 0, \text{ for all } i \quad \text{(Constraint 9)}$$

$$n_{1,i}R_{1,i} + n_{3,i}R_{3,i} \geq w_i R, \text{ for all } i \quad \text{(Constraint 11)}$$

$$n_{1,i}R_{1,i} + n_{3,i}R_{3,i} \geq R_{min,i}, \text{ for all } i \quad \text{(Constraint 12)}$$

Linear programming techniques, including conventional techniques such as the Simplex method, for example, can be used to solve this linear programming problem to determine how many slots in each of frequency reuse 1 and 3 zones should be allocated to each user i (i.e., to determine optimal values for $n_{1,i}$ and $n_{3,i}$ for all users i). It is to be understood that techniques other than linear programming also may be used to determine how many slots in each frequency reuse zone to allocate to each user.

An example communication system in which only two users or remote stations communicate with a single base station using a communication frame having only a single frequency reuse zone (e.g., a frequency reuse 1 zone) will be described for explanatory purposes. In this simplified case, the linear programming problem reduces to maximizing:

$$R = \min_{i=1,\ldots I} \frac{n_{1,i}R_{1,i}}{w_i} \quad \text{(Equation 2)}$$

subject to:

$$n_{1,1}*R_{1,1} \geq w_1*R \quad \text{(Constraint 13)}$$

$$n_{1,2}*R_{1,2} \geq w_2*R \quad \text{(Constraint 14)}$$

$$n_{1,1}*R_{1,1} \geq R_{min1} \quad \text{(Constraint 15)}$$

$$n_{1,2}*R_{1,2} \geq R_{min2} \quad \text{(Constraint 16)}$$

$$n_{1,1}+n_{1,2}=N1 \quad \text{(Constraint 17)}$$

$$n_{1,1} \geq 0 \quad \text{(Constraint 18)}$$

$$n_{1,2} \geq 0 \quad \text{(Constraint 19)}$$

Figure 4:
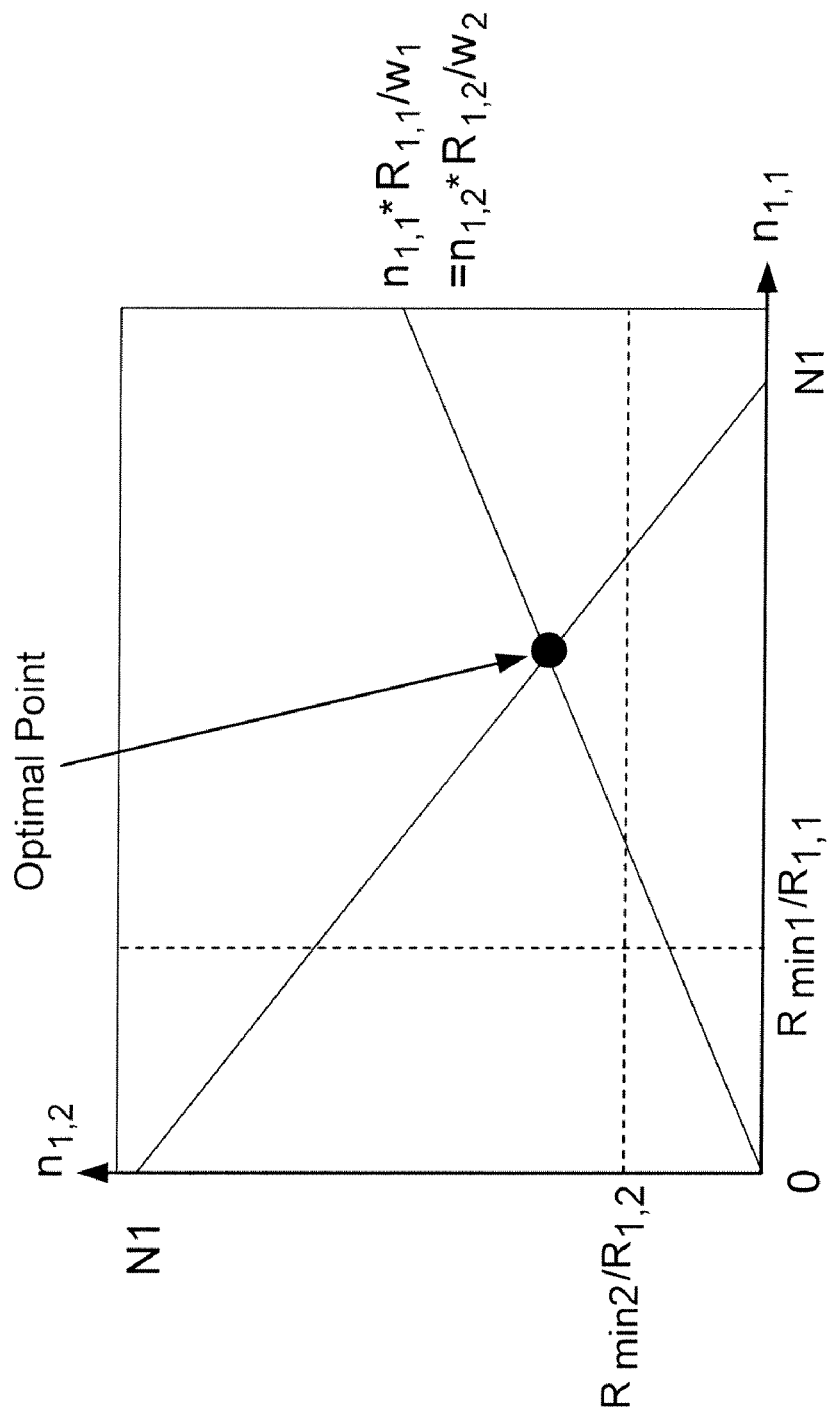
FIG. 4 depicts a graphical representation of exemplary linear programming constraints which may be used to determine a slot allocation.

This very simple linear programming problem and the corresponding solution are illustrated graphically in FIG. 4.

Constraints 18 and 19 restrict the slot allocation of each user to non-negative numbers, such that the solution must be in the upper-right quadrant, as shown.

Constraint 17 requires that all slots in the frequency reuse 1 zone be used (i.e., every slot must be allocated to one of the two remote stations).

Constraints 13 and 14 implement the "best efforts" requirement of each of the two remote stations, with an optimal solution produced when equality holds for each of those two constraints (i.e., when $n_{1,1}*R_{1,1}=w_1*R$ and $n_{1,2}*R_{1,2}=w_2*R$) such that the two constraints can be combined to produce a linear equation in $n_{1,1}$ and $n_{1,2}$, namely:

$$\frac{n_{1,1}R_{1,1}}{w_1} = \frac{n_{1,2}R_{1,i2}}{w_2} \quad \text{(Equation 3)}$$

This line is also shown graphically in FIG. 4.

Constraints 15 and 16 implement the minimum data rate requirements of the two users.

This very simplified example involving only a frequency reuse 1 zone and no minimum data rate requirement for either of the two users (i.e., $R_{min1}=R_{min2}=0$) yields a very simple closed-form solution for the optimal slot allocation among I users:

$$n_{1,j} = \frac{\frac{w_j}{R_{1,j}}}{\sum_{i=1}^{i} \frac{w_i}{R_{1,i}}} N_1, \, j = 1, \ldots, I \quad \text{(Equation 4)}$$

The foregoing description provides one embodiment of a method of calculating slot allocations. For simplicity of description, the numbers of slots were not constrained to be integers. However, as will be readily apparent to those skilled in the art, the numbers of slots $n_{f,i}$ should have integer values for all f=1,3 (i.e., for all frequency reuse zones) and for i=1, . . . , I (i.e., for all users). Therefore, after a slot allocation solution is found as described herein, any suitable post-processing algorithm may be applied to obtain an integer slot allocation solution close to the calculated optimal solution. For example, conventional integer programming, round-off, or other optimization techniques may be used.

Figure 5:
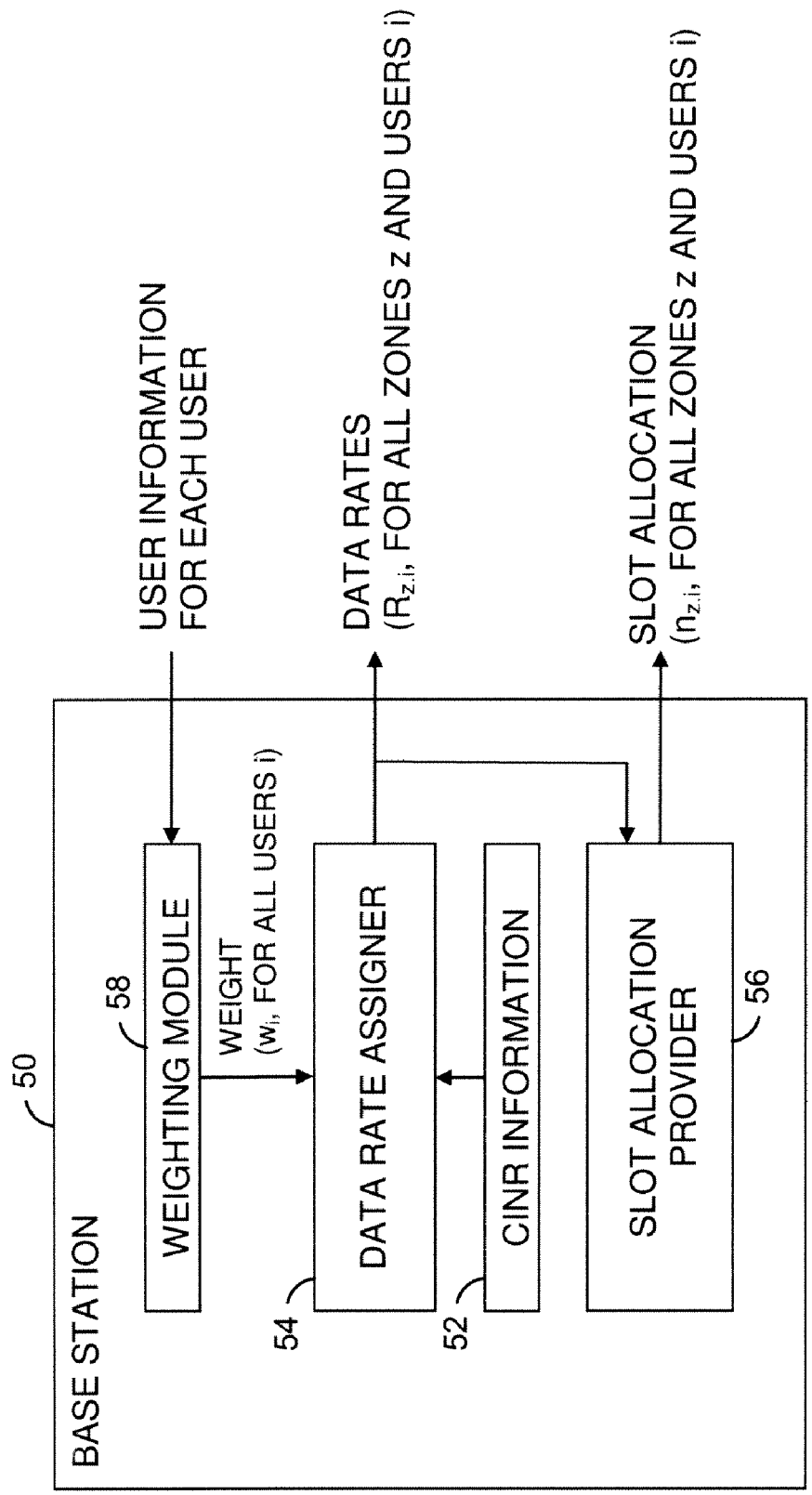
FIG. 5 depicts an exemplary base station that may implement slot-allocation techniques such as described herein.

FIG. 5 depicts a block diagram of an exemplary base station 50 for a cellular or other wireless communication system employing an embodiment of a slot allocation method such as described above. The illustrated base station 50 receives information from each remote station i that is communicating with the base station 50 at a given time regarding the carrier-to-interference-plus-noise ratio (CINR) encountered by the remote station i within each frequency reuse zone z used by the communication system at that time. The CINR information, collectively represented by a block 52 in FIG. 5, is provided to a data rate assigner 54, which assigns to each remote station i a frequency reuse zone data rate $R_{i,z}$ for communication of that remote station in each frequency reuse zone z, which may be calculated as a pre-determined function of the current $CINR_{i,z}$ encountered by the remote station i in the frequency reuse zone z. For example, the data rates $R_{i,z}$ may be calculated according to the formula $R_{i,z}=\log(1+CINR_{i,z}/\text{Gamma})$, where Gamma is a constant (e.g., Gamma=1). The data rates are used by a slot allocation provider 56 to determine a slot allocation for each remote station i, comprising a number $n_{z,i}$ of slots of each frequency reuse zone z to allocate to remote station i for communication of remote station i within frequency reuse zone z. The base station 50 provides the data rates produced by the data rate assigner 54 and the slot allocations produced by the slot allocation provider 56 to the remote stations to permit subsequent communication between the remote stations and the base station 50. The base station 50 may also include a weighting module 58 configured to assign a weight to each remote station based on, for example, a quality of service requirement of the remote station or other user information regarding each user or remote station. A weighted data rate of each remote station may then be based on the weight assigned to that remote station.

Each of the blocks of the base station 50 shown in FIG. 5 may be implemented as machine-readable instructions executed by a processor. Such instructions may be stored in a memory coupled to the processor or in any other desired computer-readable medium.

For illustrative purposes, the slot-allocation techniques described above were in the context of a WiMAX system, which employs orthogonal frequency-division multiple-access to modulate the communicated data. However, similar slot-allocation techniques also may be applied in systems employing other modulation techniques. Further, the slot-allocation techniques are not constrained to frequency reuse 1 and 3 zones and can be applied to any other fractional frequency reuse zones and schemes and, further, can be employed in systems with more than two frequency reuse zones.

Those skilled in the art will also appreciate that slot-allocation methods and apparatus such as described above may provide for slot allocations to be developed entirely or partially within a base station or in any other suitable centralized or distributed location.

Although examples in the context of WiMAX (i.e., 802.16a/d/e) were discussed above, these slot allocation techniques may be utilized in other contexts as well such as digital audio broadcast (DAB) systems and digital video broadcast (DVB) systems. More generally, techniques such as described above can be utilized in any OFDM synchronous communication system.

Figure 6A:
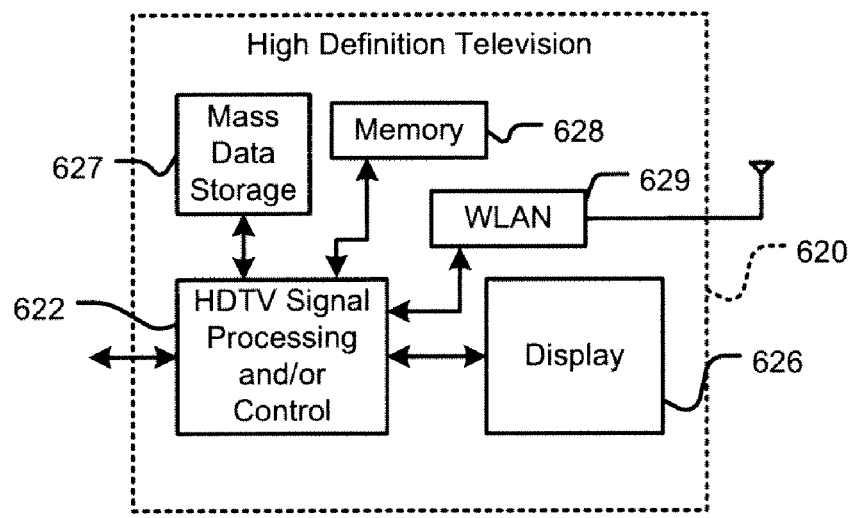
FIG. 6A is a block diagram of a high definition television that may employ slot allocation techniques such as described herein.

Referring now to FIGS. 6A-6F, various example devices that may communicate via a base station that utilizes slot allocation techniques such as described above will be described. Referring to FIG. 6A, such techniques may be utilized in a high definition television (HDTV) 620. The HDTV 620 includes signal processing and/or control circuits, which are generally identified in FIG. 6A at 622, a WLAN interface 629, and a mass data storage 627. Slot allocation techniques may be utilized in the WLAN interface 629 or the signal processing circuit and/or control circuit 622, for example. HDTV 620 receives HDTV input signals in either a wired or wireless format and generates HDTV output signals for a display 626. In some implementations, signal processing circuit and/or control circuit 622 and/or other circuits (not shown) of HDTV 620 may process data, perform coding and/or encryption, perform calculations, format data and/or perform any other type of HDTV processing that may be required.

HDTV 620 may communicate with mass data storage 627 that stores data in a nonvolatile manner such as optical and/or magnetic storage devices. The mass data storage 627 may include one or more hard disk drives (HDDs) and/or one or more digital versatile disks (DVDs). One or more of the HDDs may be a mini HDD that includes one or more platters having a diameter that is smaller than approximately 1.8". HDTV 620 may be connected to memory 628 such as RAM, ROM, low-latency nonvolatile memory such as flash memory and/or other suitable electronic data storage. HDTV 620 also may support connections with a WLAN via the WLAN network interface 629.

Figure 6B:
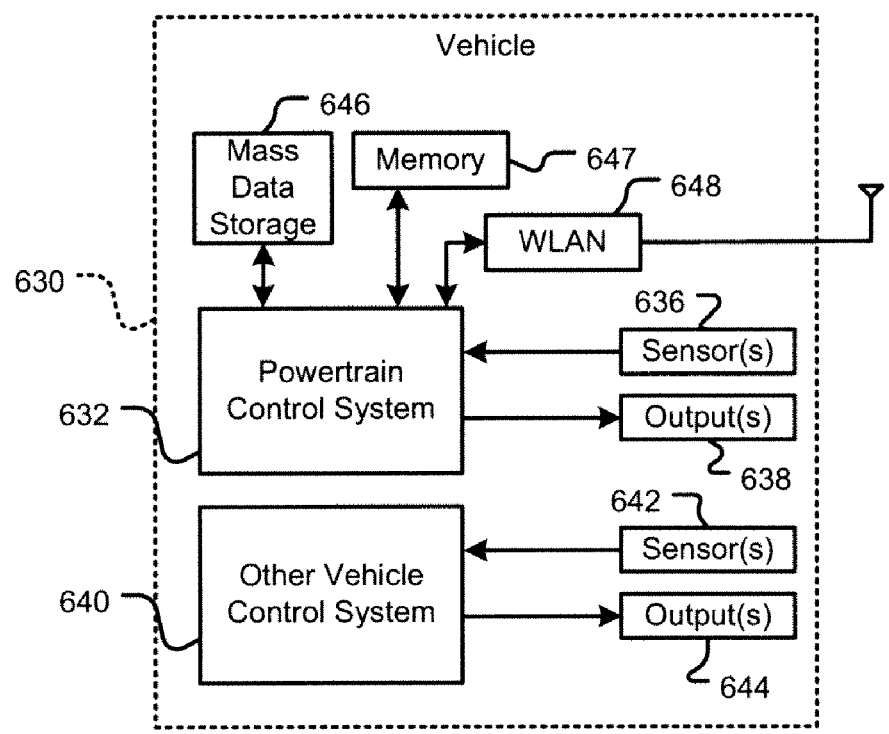
FIG. 6B is a block diagram of a vehicle that may employ slot allocation techniques such as described herein.

Referring now to FIG. 6B, techniques such as described above may be utilized in a control system of a vehicle 630. In some implementations, a powertrain control system 632 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

A control system 640 may likewise receive signals from input sensors 642 and/or output control signals to one or more output devices 644. In some implementations, control system 640 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 632 may communicate with mass data storage 646 that stores data in a nonvolatile manner. Mass data storage 646 may include optical and/or magnetic storage devices for example hard disk drives HDD and/or DVDs. One or more of the HDDs may be a mini HDD that includes one or more platters having a diameter that is smaller than approximately 1.8". Powertrain control system 632 may be connected to memory 647 such as RAM, ROM, low-latency nonvolatile memory such as flash memory and/or other suitable electronic data storage. Powertrain control system 632 also may support connections with a WLAN via a WLAN network interface 648. Slot allocation techniques such as described above may be implemented in the WLAN interface 648. The control system 640 may also include mass data storage, memory and/or a WLAN interface (all not shown).

Figure 6C:
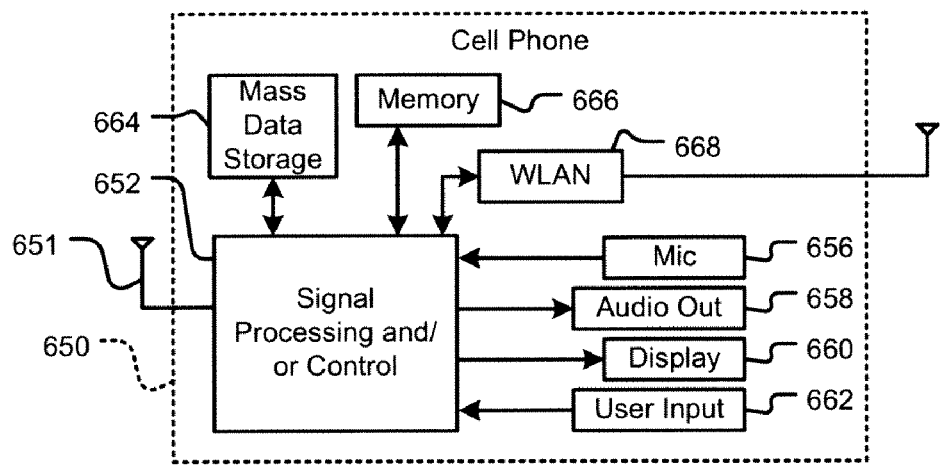
FIG. 6C is a block diagram of a cellular phone that may employ slot allocation techniques such as described herein.

Referring now to FIG. 6C, techniques such as described above may also be utilized in a cellular phone 650 that may include a cellular antenna 651. The cellular phone 650 includes signal processing and/or control circuits, which are generally identified in FIG. 6C at 652, a WLAN interface 668, and a mass data storage 664. Slot allocation techniques may be implemented in the signal processing and/or control circuits 652 and/or the WLAN interface 668, for example. In some implementations, cellular phone 650 includes a microphone 656, an audio output 658 such as a speaker and/or audio output jack, a display 660 and/or an input device 662 such as a keypad, pointing device, voice actuation and/or other input device. Signal processing and/or control circuits 652 and/or other circuits (not shown) in cellular phone 650 may process data, perform coding and/or encryption, perform calculations, format data and/or perform other cellular phone functions.

Cellular phone 650 may communicate with mass data storage 664 that stores data in a nonvolatile manner such as optical and/or magnetic storage devices for example hard disk drives HDD and/or DVDs. At least one HDD may be a mini HDD that includes one or more platters having a diameter that is smaller than approximately 1.8". Cellular phone 650 may be connected to memory 666 such as RAM, ROM, low-latency nonvolatile memory such as flash memory and/or other suitable electronic data storage. Cellular phone 650 also may support connections with a WLAN via a WLAN network interface 668.

Figure 6D:
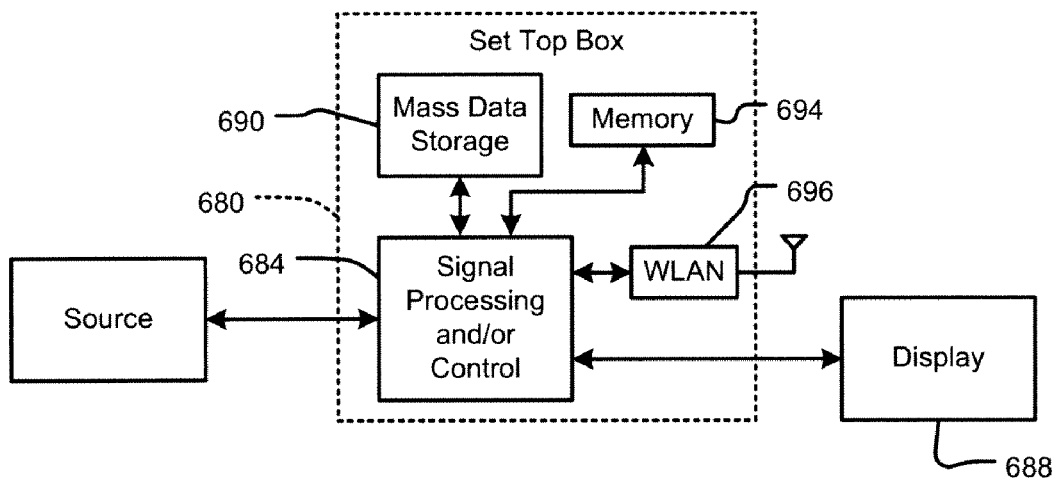
FIG. 6D is a block diagram of a set top box that may employ slot allocation techniques such as described herein.

Referring now to FIG. 6D, techniques such as described above may be utilized in a set top box 680. The set top box 680 includes signal processing and/or control circuits, which are generally identified in FIG. 6D at 684, a WLAN interface 696, and a mass data storage device 690. Slot allocation techniques may be implemented in the signal processing and/or control circuits 684 and/or the WLAN interface 696, for example. Set top box 680 receives signals from a source such as a broadband source and outputs standard and/or high-definition audio/video signals suitable for a display 688 such as a television and/or monitor and/or other video and/or audio output devices. Signal processing and/or control circuits 684 and/or other circuits (not shown) of the set top box 680 may process data, perform coding and/or encryption, perform calculations, format data and/or perform any other set top box function.

Set top box 680 may communicate with mass data storage 690 that stores data in a nonvolatile manner. Mass data storage 690 may include optical and/or magnetic storage devices for example hard disk drives HDD and/or DVDs. At least one HDD may be a mini HDD that includes one or more platters having a diameter that is smaller than approximately 1.8". Set top box 680 may be connected to memory 694 such as RAM, ROM, low-latency nonvolatile memory such as flash memory and/or other suitable electronic data storage. Set top box 680 also may support connections with a WLAN via the WLAN network interface 696.

Figure 6E:
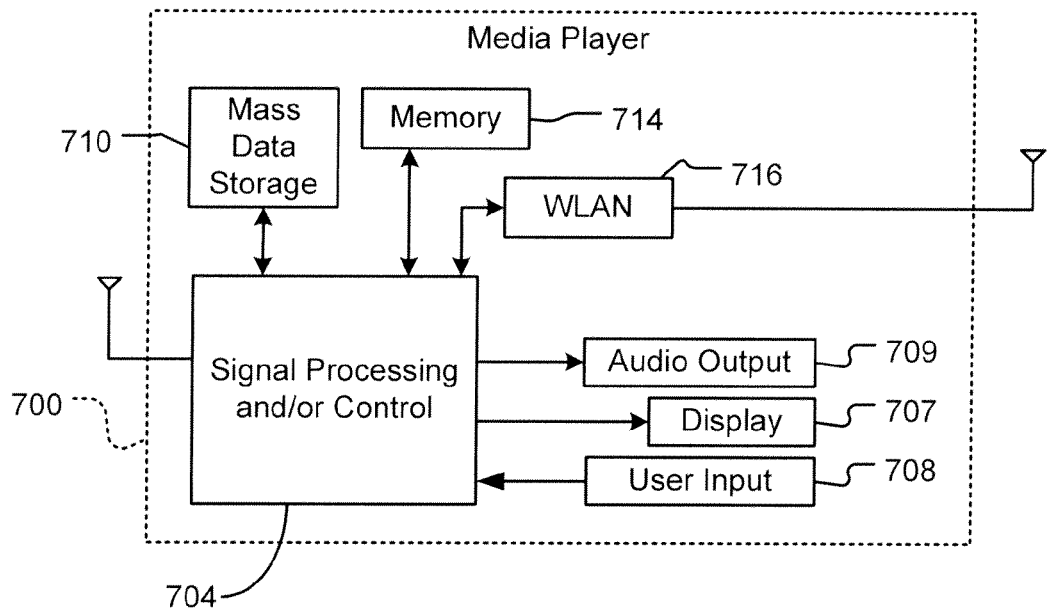
FIG. 6E is a block diagram of a media player that may employ slot allocation techniques such as described herein.

Referring now to FIG. 6E, techniques such as described above may be utilized in a media player 700. The media player 700 may include signal processing and/or control circuits, which are generally identified in FIG. 6E at 704, a WLAN interface 716, and a mass data storage device 710. Slot allocation techniques may be implemented in the signal processing and/or control circuits 704 and/or the WLAN interface 716, for example. In some implementations, media player 700 includes a display 707 and/or a user input 708 such as a keypad, touchpad and the like. In some implementations, media player 700 may employ a graphical user interface (GUI) that typically employs menus, drop down menus, icons and/or a point-and-click interface via display 707 and/or user input 708. Media player 700 further includes an audio output 709 such as a speaker and/or audio output jack. Signal processing and/or control circuits 704 and/or other circuits (not shown) of media player 700 may process data, perform coding and/or encryption, perform calculations, format data and/or perform any other media player function.

Media player 700 may communicate with mass data storage 710 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may be a mini HDD that includes one or more platters having a diameter that is smaller than approximately 1.8". Media player 700 may be connected to memory 714 such as RAM, ROM, low-latency nonvolatile memory such as flash memory and/or other suitable electronic data storage. Media player 700 also may support connections with a WLAN via a WLAN network interface 716. Still other implementations in addition to those described above are contemplated.

Figure 6F:
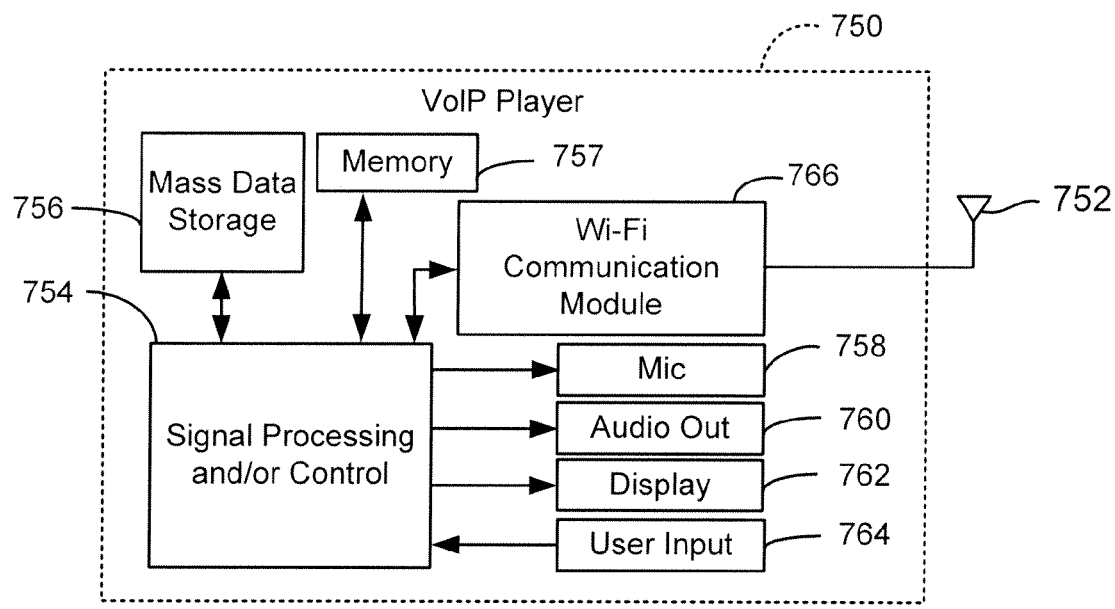
FIG. 6F is a block diagram of a voice-over-IP device that may employ slot allocation techniques such as described herein.

Referring to FIG. 6F, techniques such as described above may be utilized in a Voice over Internet Protocol (VoIP) phone 750 that may include an antenna 754, signal processing and/or control circuits 758, a wireless interface 762, and a mass data storage 766. Slot allocation techniques described above may be implemented in the signal processing and/or control circuits 758 and/or the wireless interface 762, for example. In some implementations, VoIP phone 750 includes, in part, a microphone 770, an audio output 774 such as a speaker and/or audio output jack, a display monitor 778, an input device 782 such as a keypad, pointing device, voice actuation and/or other input devices, and a Wireless Fidelity (Wi-Fi) communication module 762. Signal processing and/or control circuits 758 and/or other circuits (not shown) in VoIP phone 750 may process data, perform coding and/or encryption, perform calculations, format data and/or perform other VoIP phone functions.

VoIP phone 750 may communicate with mass data storage 766 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 750 may be connected to memory 786, which may be a RAM, ROM, low-latency nonvolatile memory such as flash memory and/or other suitable electronic data storage. VoIP phone 750 is configured to establish communications link with a VoIP network (not shown) via Wi-Fi communication module 762.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions, or deletions in addition to those explicitly described above may be made to the disclosed embodiments without departing from the spirit and scope of the invention.

What is claimed is:

1. A method of allocating slots in a slot-based communication system having i) at least one base station and ii) a plurality of remote stations, wherein communication among the at least one base station and the plurality of remote stations is partitioned into a series of frames, each frame including at least a first frequency reuse zone having a first total number of slots, the method comprising the steps of:

assigning, to each remote station of the plurality of remote stations, a first frequency reuse zone data rate for communication of that remote station using slots of the first frequency reuse zone; and providing, for each remote station, a respective slot allocation for communication between that remote station and the base station, wherein each respective slot allocation comprises a first number of slots of the first frequency reuse zone, wherein each remote station has a weighted data rate dependent on i) the first frequency reuse zone data rate assigned to that remote station and ii) the respective slot allocation of that remote station, and wherein a minimum of the weighted data rates of the plurality of remote stations varies with the respective slot allocations provided for the plurality of remote stations; and determining the respective slot allocations of the plurality of remote stations so as to maximize the minimum of the weighted data rates of the plurality of remote stations.

2. The method of claim 1, further comprising the step of assigning a weight to each remote station, wherein the weighted data rate of each remote station is further based on the weight assigned to that remote station.

3. The method of claim 2, wherein the weighted data rate of each remote station i is given by $$\frac{n_{1,i} R_{1,i}}{w_i},$$

where $n_{1,i}$ is the first number of slots of the first frequency reuse zone allocated to remote station i, $R_{1,i}$ is the first frequency reuse zone data rate assigned to the remote station i for communication using slots of the first frequency reuse zone, and $w_i$ is the weight assigned to the remote station i.

4. The method of claim 2, wherein each frame includes a second frequency reuse zone having a second total number of slots, the method further comprising the steps of assigning to each remote station of the plurality of remote stations a second frequency reuse zone data rate for communication of that remote station using slots of the second frequency reuse zone, wherein at least one of the respective slot allocations further comprises a portion of the total number of slots of the second frequency reuse zone, wherein the weighted data rate of each remote station is further dependent on the second frequency reuse zone data rate assigned to that remote station.

5. The method of claim 4, wherein the weighted data rate of each remote station i is given by $$\frac{n_{1,i}R_{1,i} + n_{3,i}R_{3,i}}{w_i},$$

where $n_{1,i}$ is the first number of slots of the first frequency reuse zone allocated to remote station i, $n_{3,i}$ is the second number of slots of the second frequency reuse zone allocated to remote station i, $R_{1,i}$ is the first frequency reuse zone data rate assigned to the remote station i for communication using slots of the first frequency reuse zone, $R_{3,i}$ is the second frequency reuse zone data rate assigned to the remote station i for communication using slots of the second frequency reuse zone, and $w_i$ is the weight assigned to the remote station i.

6. The method of claim 2, wherein each frame includes Z frequency reuse zones, wherein Z is an integer greater than or equal to 2, each frequency reuse zone having a corresponding total number of slots, the method further comprising the steps of assigning to each remote station of the plurality of remote stations a frequency reuse zone data rate for each of the Z frequency reuse zones for communication of that remote station using slots of the that frequency reuse zone, wherein at least one of the respective slot allocations further comprises at least a portion of the total number of slots of each frequency reuse zone, wherein the weighted data rate of each remote station i is given by $$\frac{\sum_{z=1}^{Z} n_{z,i}R_{z,i}}{w_i},$$

where $n_{z,i}$ is the number of slots of the $z^{th}$ frequency reuse zone allocated to remote station i, $R_{z,i}$ is the frequency reuse zone data rate assigned to the remote station i for communication using slots of the $z^{th}$ frequency reuse zone, and $w_i$ is the weight assigned to the remote station i.

7. The method of claim 6, wherein every slot in at least one of the Z frequency reuse zones is allocated to a remote station.

8. The method of claim 1, further comprising the step of maximizing the minimum of the weighted data rates of the plurality of remote stations using linear programming.

9. The method of claim 1, wherein the slot-based communication system is a WiMAX system.

10. The method of claim 1, further comprising the step of communicating data between the at least one base station and at least one of the plurality of remote stations in accordance with the respective slot allocation of that remote station.

11. The method of claim 10, wherein the communicating step is performed using orthogonal frequency division multiplexing.

12. The method of claim 1, wherein at least one of the remote stations has a corresponding minimum required data rate and wherein the slot allocation for that remote station achieves a data rate for that remote station that is at least as great as the corresponding minimum required data rate for that remote station.

13. The method of claim 12, further comprising the step of maximizing the minimum of the weighted data rates of the plurality of remote stations using linear programming.

14. A communication device for allocating slots in a slot-based communication system having i) at least one base station and ii) a plurality of remote stations, wherein communication among the at least one base station and the plurality of remote stations is partitioned into a series of frames, each frame including at least a first frequency reuse zone having a first total number of slots, the communication device having a network interface configured to:

assign, to each remote station of the plurality of remote stations, a first frequency reuse zone data rate for communication of that remote station using slots of the first frequency reuse zone; and provide, for each remote station, a respective slot allocation for communication between that remote station and the base station, each respective slot allocation comprising a first number of slots of the first frequency reuse zone, wherein each remote station has a weighted data rate dependent on i) the first frequency reuse zone data rate assigned to that remote station and ii) the respective slot allocation of that remote station;

wherein a minimum of the weighted data rates of the plurality of remote stations varies with the respective slot allocations provided for the plurality of remote stations; and wherein the respective slot allocations of the plurality of remote stations are determined so as to maximize the minimum of the weighted data rates of the plurality of remote stations.

15. The communication device of claim 14, wherein the network interface is further configured to assign a weight to each remote station, wherein the weighted data rate of each remote station is further dependent on the weight assigned to that remote station.

16. The communication device of claim 15, wherein the weighted data rate of each remote station i is given by $$\frac{n_{1,i}R_{1,i}}{w_i},$$

where $n_{1,i}$ is the first number of slots of the first frequency reuse zone allocated to remote station i, $R_{1,i}$ is the first frequency reuse zone data rate assigned to the remote station i for communication using slots of the first frequency reuse zone, and $w_i$ w the weight assigned to the remote station i.

17. The communication device of claim 15, wherein each frame includes a second frequency reuse zone having a second total number of slots, and wherein the network interface is further configured to assign to each remote station of the plurality of remote stations a second frequency reuse zone data rate for communication of that remote station using slots of the second frequency reuse zone, wherein at least one of the respective slot allocations further comprises a portion of the total number of slots of the second frequency reuse zone, wherein the weighted data rate of each remote station is further dependent on the second frequency reuse zone data rate assigned to that remote station.

18. The communication device of claim 17, wherein the weighted data rate of each remote station i is given by $$\frac{n_{1,i}R_{1,i} + n_{3,i}R_{3,i}}{w_i},$$

where $n_{1,i}$ is the first number of slots of the first frequency reuse zone allocated to remote station i, $n_{3,i}$ is the second number of slots of the second frequency reuse zone allocated to remote station i, $R_{1,i}$ is the first frequency reuse zone data rate assigned to the remote station i for communication using slots of the first frequency reuse zone, $R_{3,i}$ is the second frequency reuse zone data rate assigned to the remote station i for communication using slots of the second frequency reuse zone, and $w_i$ is the weight assigned to the remote station i.

19. The communication device of claim 15, wherein each frame includes Z frequency reuse zones, wherein Z is an integer greater than or equal to 2, each frequency reuse zone having a corresponding total number of slots, and wherein the network interface is further configured to assign to each remote station of the plurality of remote stations a frequency reuse zone data rate for each of the Z frequency reuse zones for communication of that remote station using slots of the that frequency reuse zone, wherein at least one of the respective slot allocations further comprises at least a portion of the total number of slots of each frequency reuse zone, wherein the weighted data rate of each remote station i is given by $$\frac{\sum_{z=1}^{Z} n_{z,i} R_{z,i}}{w_i},$$

where $n_{z,i}$ is the number of slots of the $z^{th}$ frequency reuse zone allocated to remote station i, $R_{z,i}$ is the frequency reuse zone data rate assigned to the remote station i for communication using slots of the $z^{th}$ frequency reuse zone, and $w_i$ is the weight assigned to the remote station i.

20. The communication device of claim 19, wherein every slot in at least one of the frequency reuse zones is allocated to a remote station.

21. The communication device of claim 14, wherein the network interface is further configured to maximize the minimum of the weighted data rates of the plurality of remote stations using linear programming.

22. The communication device of claim 14, wherein the slot-based communication system is a WiMAX system.

23. The apparatus communication device of claim 14, wherein at least one of the remote stations has a corresponding minimum required data rate and wherein the slot allocation for that remote station achieves a data rate for that remote station that is at least as great as the corresponding minimum required data rate for that remote station.

24. The communication device of claim 23, wherein the network interface is further configured to maximize the minimum of the weighted data rates of the plurality of remote stations using linear programming.

* * * * *